(12) United States Patent
Isakovich

(10) Patent No.: US 10,949,361 B1
(45) Date of Patent: Mar. 16, 2021

(54) MULTIPROCESSOR SOFTWARE-DEFINED SOLID-STATE STORAGE DRIVE

(71) Applicant: Nimbus Data, Inc., Irvine, CA (US)

(72) Inventor: Thomas Isakovich, Newport Coast, CA (US)

(73) Assignee: Nimbus Data, Inc., Irvine, CA (US)

( * ) Notice: Subject to any disclaimer, the term of this patent is extended or adjusted under 35 U.S.C. 154(b) by 107 days.

(21) Appl. No.: 16/056,138

(22) Filed: Aug. 6, 2018

Related U.S. Application Data

(60) Provisional application No. 62/541,534, filed on Aug. 4, 2017.

(51) Int. Cl.
| | |
|---|---|
| *G06F 3/06* | (2006.01) |
| *G06F 13/16* | (2006.01) |
| *G06F 13/12* | (2006.01) |
| *G11C 29/52* | (2006.01) |
| *G06F 21/87* | (2013.01) |
| *G06F 11/10* | (2006.01) |

(52) U.S. Cl.
CPC ........ *G06F 13/126* (2013.01); *G06F 11/1068* (2013.01); *G06F 13/1668* (2013.01); *G06F 21/87* (2013.01); *G11C 29/52* (2013.01)

(58) Field of Classification Search
CPC ............... G06F 13/126; G06F 13/1668; G06F 11/1068; G06F 21/87; G11C 29/52
See application file for complete search history.

(56) References Cited

U.S. PATENT DOCUMENTS

| | | | | |
|---|---|---|---|---|
| 9,921,757 | B1* | 3/2018 | Rowett | G06F 3/0647 |
| 2009/0291571 | A1* | 11/2009 | Davis | G06F 21/71 |
| | | | | 439/55 |
| 2011/0153903 | A1* | 6/2011 | Hinkle | G06F 13/20 |
| | | | | 710/313 |
| 2014/0281311 | A1* | 9/2014 | Walker | G06F 3/0604 |
| | | | | 711/162 |
| 2016/0259597 | A1* | 9/2016 | Worley | G06F 13/4081 |
| 2016/0321200 | A1* | 11/2016 | Long | G06F 13/4282 |
| 2017/0255515 | A1* | 9/2017 | Kim | G06F 3/065 |
| 2017/0262178 | A1* | 9/2017 | Hashimoto | G06F 3/064 |
| 2018/0060148 | A1* | 3/2018 | Rudy | G11C 29/38 |
| 2018/0284990 | A1* | 10/2018 | Kachare | G06F 13/4022 |

* cited by examiner

*Primary Examiner* — Charles Rones
*Assistant Examiner* — Tong B. Vo
(74) *Attorney, Agent, or Firm* — Charles Shemwell

(57) ABSTRACT

A solid state disk comprising includes a plurality of protected flash memory modules each having a plurality of flash memory devices, a flash memory controller, power protection circuitry and interconnect interface. Each of the protected flash memory modules is removably inserted into a socketed interconnect and coupled thereby to a circuit board having a multicore flash processor, host interface and program code store. The multicore flash processor executes program code stored in the program store to enable an external agent interacting with the solid state disk via the host interface to perceive the solid state disk as having a single flash controller instead of the multiple flash controllers disposed respectively on the protected flash memory modules.

13 Claims, 4 Drawing Sheets

Conventional SSD Architecture

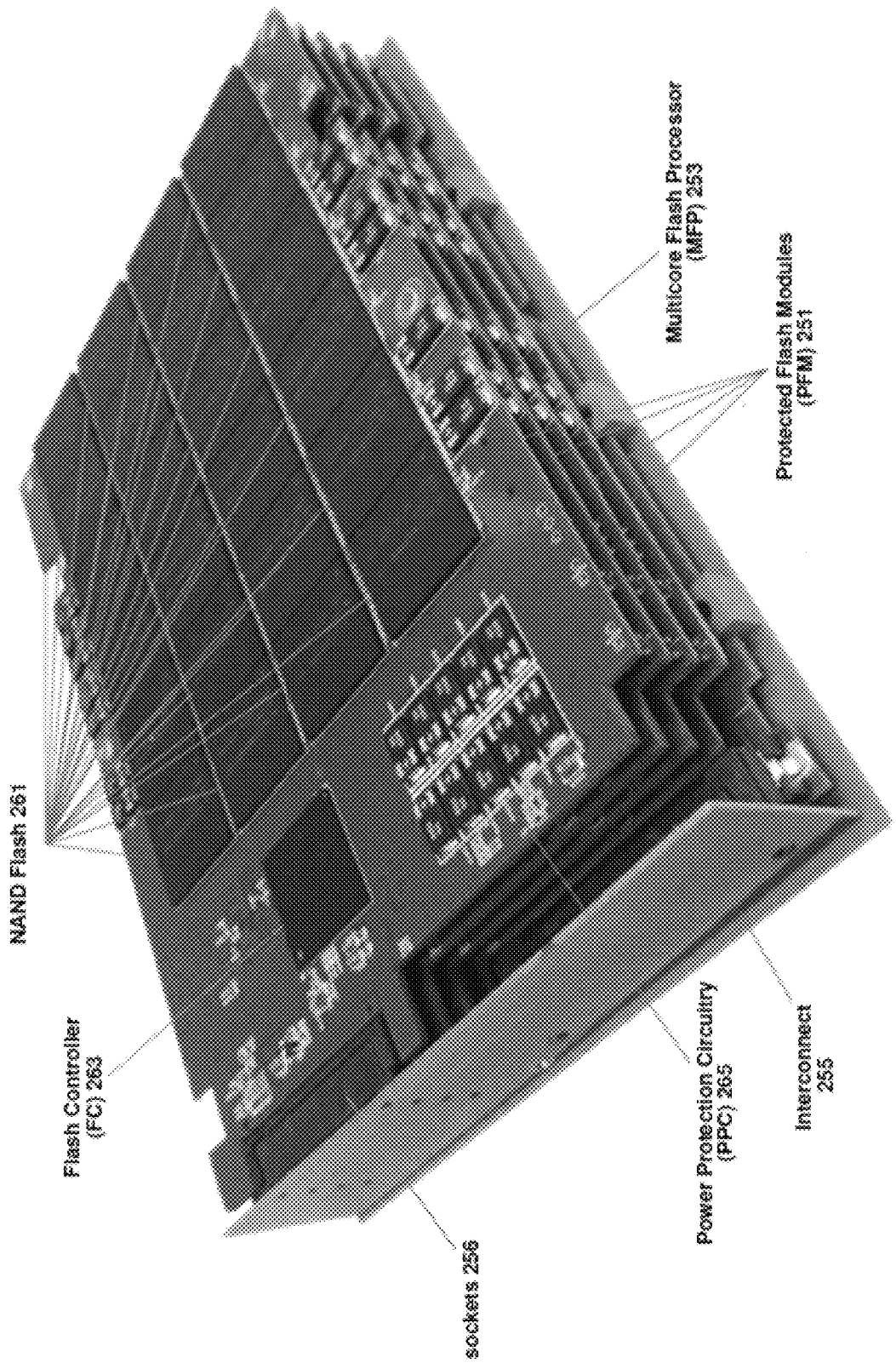
FIG. 3  Multiple PFMs, each with its own FC, NAND Flash, and PPC, interconnected to a MFP

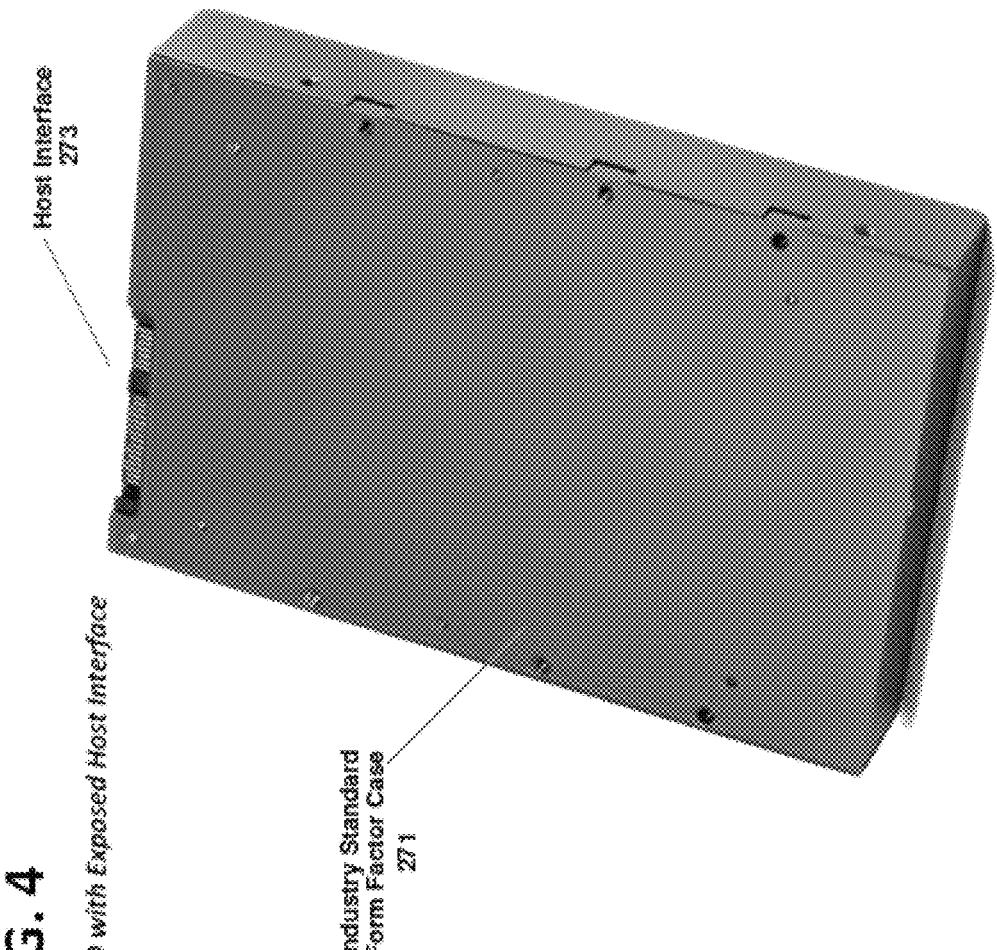

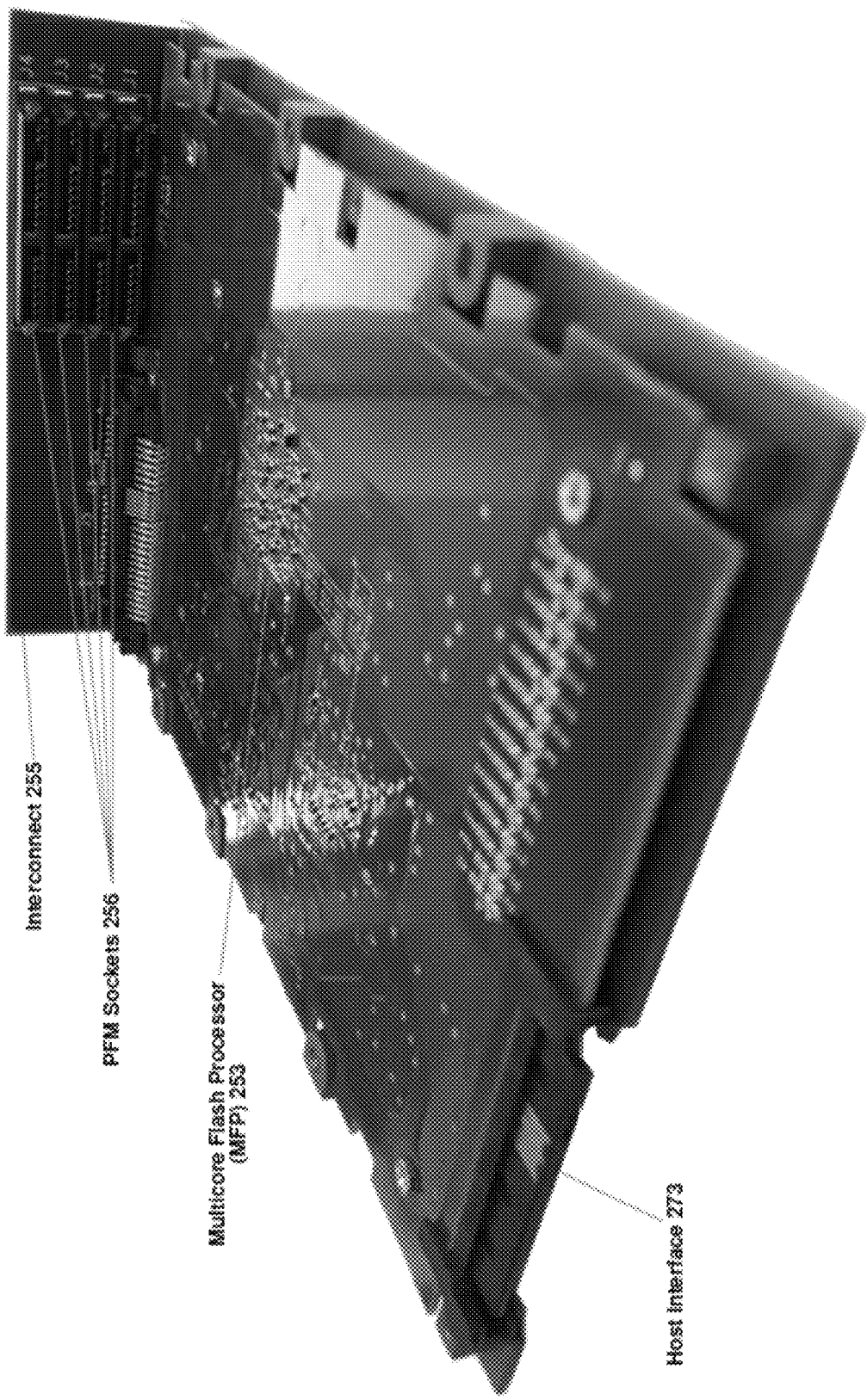
FIG. 5 MPSD SSD with MFP and interconnect sockets for incrementally adding/removing PFMs

MULTIPROCESSOR SOFTWARE-DEFINED SOLID-STATE STORAGE DRIVE

CROSS REFERENCE TO RELATED APPLICATIONS

This application hereby claims priority to and incorporates by reference U.S. provisional application No. 62/541,534 filed Aug. 4, 2017.

TECHNICAL FIELD

The disclosure herein relates to data processing and more particularly to data storage technology.

INTRODUCTION

Conventional Solid-State Drives (SSD's) consist of a plurality of NAND flash and Power Protection Circuitry (PPC), all managed by a single Flash Controller (FC)—a special-purpose application-specific integrated circuit (ASIC) with embedded firmware. In general, the FC handles all functions of the host SSD, including:
  Error correction (ECC)
  Wear-leveling of write operations across NAND flash evenly
  DRAM buffering of write operations for performance acceleration
  Works with PPC to destage (transfer) DRAM contents to NAND flash in the event of power loss
  Aggregation of capacity of all NAND flash into a single logical device (SLD)
  Representing SLD using a protocol or interface, such as SATA (Serial Advanced Technology Attachment), SAS (Serial Attached SCSI-Small Computer System Interface), or NVMe (Non-Volatile Memory express), to a host computer Conventional centralized-control (single FC) SSD architectures—exemplified by FIG. 1—face a number of challenges that threaten capacity-scaling and power/bandwidth performance in coming SSD generations. Examples of these challenges include:
  CPU-intensive ECC (Error Correcting Code) processing, increasing in intensity as more NAND flash is added—and next-generation NAND flash devices such as TLC (Triple-Level Cell) and QLC (Quad-Level Cell) will likely require substantially more ECC
  FC lacks data management features such as online capacity expansion/reduction, RAID (Redundant Array of Independent Disks), erasure coding, deduplication, compression, checksums, and thin provisioning
  FC and NAND flash quantity is fixed, with no user-serviceable way to increase/decrease the capacity of the SSD

DRAWINGS

Figure 2:
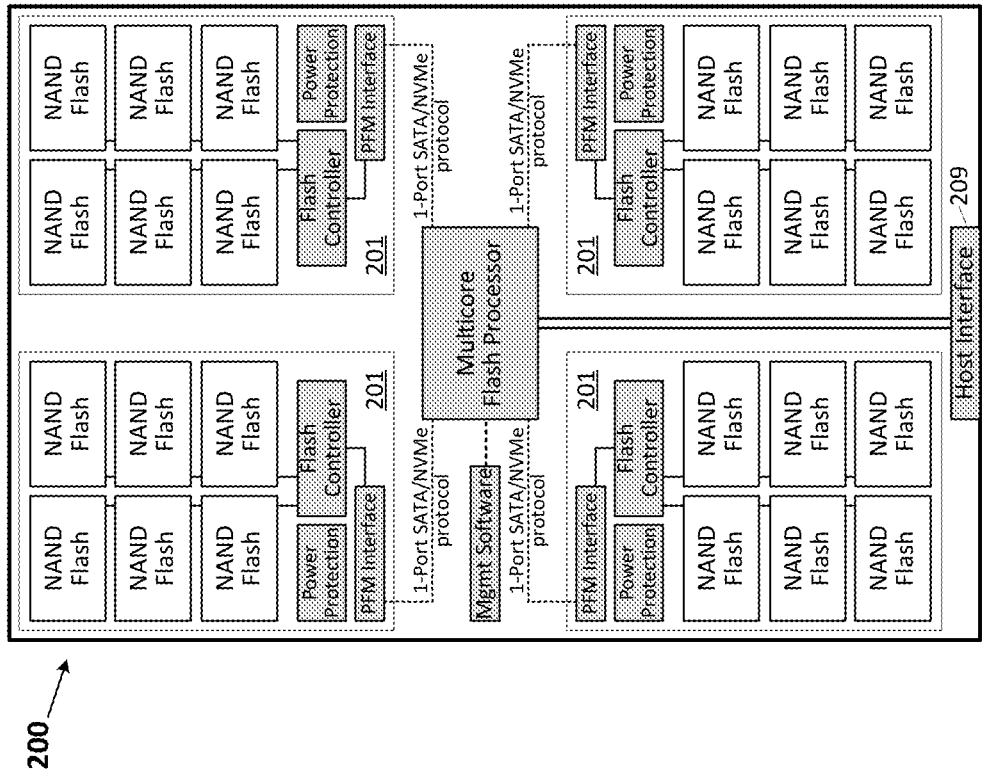
Figure 1:
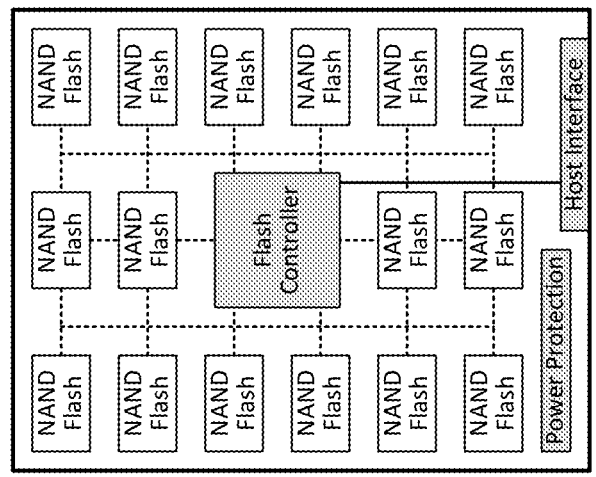

The various embodiments disclosed herein are illustrated by way of example, and not by way of limitation, in the figures of the accompanying drawings and in which like reference numerals refer to similar elements and in which:
  FIG. 1 illustrates a conventional centralized-control, single flash-controller solid-state drive architecture;
  FIG. 2 illustrates an embodiment of a Multiprocessor Software-Defined (MPSD) solid-state drive (SSD);
  FIG. 3 illustrates an exemplary component arrangement within a MPSD SSD in which protected flash modules are implemented on respective circuit boards and coupled to a multicore flash processor disposed on a separate circuit board;
  FIG. 4 illustrates the multiple-circuit board component arrangement of FIG. 3 housed within industry-standard form factor case through which a host interface is exposed; and
  FIG. 5 illustrates the MPSD SSD of FIG. 3 with the protected flash modules removed to expose the multicore flash processor disposition.

DETAILED DESCRIPTION

A multiprocessor software-defined (MPSD) SSD as disclosed herein in various embodiments employs multiple processors (ASICs or FPGAs) in a decentralized or distributed architecture together with intelligent software to offer superior storage capacity, lower power, and new functionality in the SSD itself. FIG. 2 illustrates an embodiment of an MPSD SSD architecture 150—an architecture characterized by one or more of the following features:
  A MPSD SSD is implemented by a plurality of protected flash modules 201 (PFMs), each with its own NAND flash, Flash Controller (FC) and Power Protection Circuitry (PPC) and signaling interface (PFM Interface), as well as an additional Multicore Flash Processor (MFP) and management software store (Mgmt Software).
  The PFMs and MFP may be located on a single PCB board, or, an interconnect or riser may be used so that PFMs may be added or removed within the MPSD SSD.
  The functionality performed by the FC in a conventional SSD is now distributed, with the FC on each PFM handling ECC, wear-leveling, and DRAM buffering and destaging for only the NAND flash on that PFM. Meanwhile, the MFP handles wear-leveling SSD-wide, aggregation of all NAND flash capacity into a SLD, and representing that SLD to a host computer using one or more of a variety of protocols via host interface 209.
  Software executed by the MFP (which may include the management software) provides new capabilities for the MPSD SSD, including online capacity expansion/reduction, RAID, erasure coding, deduplication, compression, checksums, and thin provisioning, to name a few.
  The MFP may employ protocol conversion to translate protocols used to communicate with individual PFMs into a different protocol at host interface 209. For example, a PFM may communicate with the MFP via a low-power protocol such as 1-port SATA or 1-port NVMe, which the MFP may convert, through execution of management software or other program code, to 2-port NVMe, 2-port SAS or 2-port Ethernet as it communicates with one or more external agents via host interface 209.

FIG. 3 illustrates an exemplary component arrangement within a MPSD SSD in which PFMs 251 are implemented on respective circuit boards and coupled to a MFP 253 (on a separate circuit board) via interconnect 255 (having interconnect-sockets 256). As shown in FIG. 4, the FIG. 3 component arrangement may be housed within industry-standard form factor case 271 through which host interface 273 is exposed. In the embodiment shown, each PFM 251 includes NAND Flash devices 261 (24 devices are depicted though any or all of the PFMs 251 may have more or fewer Flash devices), Flash controller 263 and power protection circuitry 265. FIG. 5 illustrates the MPSD SSD of FIG. 3 with PFMs removed from component sockets 256 of interconnect 255, enabling view of MFP 253 (integrated circuit disposed on underside of depicted circuit board).

Further MPSD SSD features may include, without limitation:

- An SSD device that consists of multiple flash controllers implemented, for example, by ASICs and/or FPGAs. By contrast, conventional SSDs have a solitary flash controller that manages all flash, limiting performance, capacity, and protocol support.
- The multiple PFM-distributed FCs enable increased capacity or performance, while the MFP emulates a single SSD to the host computer (i.e., host computer perceives the MPSD SSD as a single SSD, with the complexity and power of the multi-PFM architecture being hidden from the host computer).
- Capability to scale ECC processing power and NAND flash capacity in lock-step—a MPSD SSD may increase ECC processing power in lock-step with NAND flash capacity, by adding PFMs consisting of FCs and NAND flash.
- Data striping may be utilized to parallelize IO operations across PFMs to increase performance.
- Multiple FCs can be power-optimized to maintain similar performance as conventional SSDs but with dramatically higher NAND capacity in the same power envelope
- Support for transparent recovery from multiple NAND flash failures
  - i. Conventional SSDs suffer data loss by the failure of multiple NAND flash, creating risk. External host computer-level redundancy is therefore required, often using expensive RAID systems or erasure coding technology.
  - ii. A MPSD SSD may utilize the MFP to execute data protection algorithms, such as mirroring, erasure coding, or RAID algorithms across the PFMs, allowing up to 50% of the NAND flash to fail without the SSD itself failing or suffering data loss.
  - iii. A MPSD SSD requires no dependence on external host computers, storage systems or software to achieve data protection against multiple simultaneous NAND flash failures
- Internal execution of data reduction algorithms (i.e., execution within MPSD SSD)
  - i. Conventional SSDs lack data reduction features that actually reduce the NAND flash needed to store data. Rather conventional SSDs present LBAs (logical blocks) to the host computer that exactly matches the addressable capacity of the SSD.
  - ii. A MPSD SSD may utilize the MFP and resident software to employ additional algorithms to optimize capacity utilization, which may include deduplication (variable length or fixed block), compression, checksums, and thin provisioning.
  - iii. The MFP sits in-the-datapath of all IO to the SSD, ideally situated to examine incoming blocks for repetitive patterns (to employ compression) or identical blocks (computed using hashes to employ deduplication).
  - iv. As a result, a MPSD SSD with such features has an "effective" capacity that is a multiple of the actual NAND flash raw capacity, enabling a lower cost per unit of capacity
  - v. A MPSD SSD with deduplication, compression, and/or thin-provisioning may dynamically adjust the effective capacity of the SLD it represents to the host computer, automatically, based on the efficacy of deduplication and compression algorithms.
- Internal execution of data integrity algorithms (i.e., execution within MPSD SSD)
  - i. While conventional SSDs perform ECC, they are unable to detect silent data corruption, which occurs when hardware failures or external factors such as radiation flip the bits in the NAND flash without the SSD FC being aware. This leads to data corruption. As a result, existing SSDs are vulnerable to data corruption, requiring external safeguards such as a file system on the host computer which would compute checksums using processing resources and software on the host computer.
  - ii. A MPSD SSD may be self-healing. It may compute and store a checksum internal to the SSD, using the MFP and resident software. An automatic scrubbing procedure may run in the SSD in the background to compare checksums computed at the time the data was written with the current checksum value. If a mismatch is detected, silent data corruption has occurred and can be repaired using the checksum data within the SSD automatically.
  - iii. No external file system, software, or host computer resources are needed to guarantee data integrity of the SSD's contents.
- Flexible capacity expansion/reduction within the MPSD SSD
  - i. A conventional SSD has a fixed NAND flash capacity, with the flash controller and NAND flash chips "hard-wired" together on one or more PCBs within the SSD.
  - ii. The conventional SSD has specific firmware and wear-leveling algorithms programmed given the exact number of NAND flash chips present within the SSD.
  - iii. A MPSD SSD may have a modular interconnect inside the SSD, such as a riser board, allowing additional member SSDs to be physically added or removed.
  - iv. A MPSD SSD may use software to dynamically increase and decrease the logical capacity representation to the host computer when PFMs are added or removed, allowing users to increase SSD capacity on-the-fly.
  - v. Since capacity managed using the MFP and resident software, there is virtually no limit to the size an SSD can be, with 500 TB possible by 2020 (compared to 15 TB today with conventional SSD technology).
- Hierarchical two-stage wear leveling
  - i. Wear-leveling performed in two locations—at the IFP first, and at the PFMs second
  - ii. This two-stage wear-leveling compares favorably against conventional SSD designs. In a conventional SSD, the FC must wear-level across all NAND flash chips. As the number of NAND flash increases, the FC must keep more NAND flash active simultaneously (by activating multiple NAND channels), increasing power requirements. The amount of power used by the FC increases exponentially as the number of NAND channels increases, not linearly.
  - iii. In a MPSD SSD, the MFP can prioritize write operations to only a subset of the PFMs, allowing for the FC's in other PFM's to be placed into idle mode for power conservation purposes.
  - iv. In a MPSD SSD, since there are fewer NAND flash per FC, power consumption of the FC is substantially lower by avoiding the exponential increase in power in conventional SSDs.

Protocol/interface conversion in software from lightweight to enterprise-grade i. In a conventional SSD, the FC itself must present the SLD using a fixed protocol to the host computer, such as SATA, SAS, or NVMe.

ii. In a MPSD SSD, the FC of the PFMs may use a different protocol, ideally one optimized to minimize power consumption, such as SATA. Additionally, the FC in a PFM may only support 1-port communication, further reducing power requirements.

iii. In a MPSD SSD, the MFP and software may perform protocol conversion in software in turn to represent the SLD as a 2-port device for high-availability (such as dual-port SAS or dual-port NVMe) which is essential in enterprise use cases.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of ports, specific protocols, memory technology types or the like can be different from those described above in alternative embodiments. More generally, various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A solid state storage device comprising:
a plurality of protected flash memory modules each having a plurality of flash memory devices, a flash memory controller, power protection circuitry and interconnect interface;
a socketed interconnect into which each of the protected flash memory modules is removably inserted;
a host interface;
a program code store;
a multicore flash processor coupled to each of the protected flash memory modules via the socketed interconnect and to the host interface such that the multicore flash processor is disposed between each of the protected flash memory modules and the host interface, and wherein the multicore flash processor executes program code stored in the program code store such that an external agent interacting with the solid state storage device via the host interface perceives the solid state storage device as a single flash storage device instead of multiple flash storage devices with flash controllers disposed respectively on the protected flash memory modules;
an enclosure having a fixed exterior dimension that conforms to an industry-standard form factor and wherein the socketed interconnect is disposed within the enclosure and enables storage capacity of the solid state storage device to be decreased by removing one or more of the protected flash memory modules or increased by inserting, within the enclosure, one or more additional protected flash memory modules; and
wherein wear-leveling is performed in two stages including a first stage implemented by the multicore flash processor through selective distribution of write operations to the protected flash memory modules and a second stage implemented by the flash memory controller within each of the protected flash memory modules, wherein the flash memory controller within each one of the protected flash memory modules implements the second stage of wear-leveling by distributing write operations to the flash memory devices without buffering of write operations outside the one of the protected flash memory modules and without error code correction (ECC) outside the one of the protected flash memory modules such that buffering of write operations and error code correction is distributed among the plurality of protected flash memory modules.

2. The solid state storage device of claim 1 wherein the flash memory controller of each one of the protected flash memory modules performs error correction exclusively with respect to the flash memory devices co-located with the flash memory controller on the one of the protected flash memory modules.

3. The solid state storage device of claim 1 wherein the multicore flash processor communicates with one or more of the protected flash memory modules via a first communication protocol and communicates with the external agent via a second communication protocol.

4. The solid state storage device of claim 3 wherein the multicore flash processor performs a protocol conversion in forwarding information received from the one or more of the protected flash memory modules to the external agent via the host interface.

5. The solid state storage device of claim 3 wherein the first protocol is a lower power protocol than the second protocol.

6. The solid state storage device of claim 3 wherein the first protocol is a single-port protocol and the second protocol is a multiple-port protocol.

7. The solid state storage device of claim 6 wherein the first protocol is at least one of single-port Serial Advanced Technology Attachment (SATA) or single-port non-volatile memory express (NVMe) and the second protocol is at least one of two-port NVMe, two-port Ethernet or two-port serial attached small computer system interface (SAS).

8. The solid state storage device of claim 1 wherein the host interface comprises an interface in accordance with at least one of the following standards: Serial Advanced Technology Attachment (SATA), serial attached small computer system interface (SAS), non-volatile memory express (NVMe), peripheral component interconnect express (PCIe), and/or Ethernet.

9. The solid state storage device of claim 1 wherein the multicore flash processor further enables, through execution of the program code, the external agent to perceive the solid state storage device as having a single indivisible storage capacity instead of multiple separate capacities corresponding, respectively, to the plurality of protected flash memory modules.

10. The solid state storage device of claim 1 wherein the multicore flash processor performs, through execution of the program code, data striping to increase performance within the plurality of protected flash memory modules by load-balancing and parallelizing data operations therein.

11. The solid state storage device of claim 3 wherein the multiple-port protocol enables multiple distinct hosts to access the solid state storage device simultaneously.

12. The solid state storage device of claim 5 wherein the first protocol consumes less power than the second protocol through execution of the program code within the program store to prioritize operations to a subset of the protected flash memory modules and render one or more of the protected flash memory modules not included in the subset to a reduced power state.

13. The solid state storage device of claim 1 wherein the multicore flash processor performs, through execution of the program code, at least one of the following data management functions with respect to data being transferred between the external agent and the protected flash memory modules: data striping, data deduplication or data compression.

\* \* \* \* \*